United States Patent

Gray

[15] 3,644,235

[45] Feb. 22, 1972

[54] POLYURETHANE FOAMS

[72] Inventor: Michael Alexander Howat Gray, Harlington, England

[73] Assignee: E. I. du Pont de Nemours and Company, Wilmington, Del.

[22] Filed: Feb. 20, 1969

[21] Appl. No.: 801,148

[30] Foreign Application Priority Data

Feb. 22, 1968 Great Britain..........................8,725/68

[52] U.S. Cl. ..................................260/2.5 AM, 260/2.5 AT
[51] Int. Cl. ......................................C08g 22/44, C08g 53/10
[58] Field of Search.................260/2.5 AM, 2.5 AT, 2.5 AX, 260/77.5 AX, 2.5 AZ

[56] References Cited

UNITED STATES PATENTS

| | | | |
|---|---|---|---|
| 3,097,191 | 7/1963 | France et al. | 260/77.5 |
| 3,188,302 | 6/1965 | Lorenz | 260/77.5 |
| 3,215,652 | 11/1965 | Kaplan | 260/2.5 |
| 3,359,295 | 12/1967 | Shultz et al. | 260/453 |
| 3,412,071 | 11/1968 | Sundholm | 260/75 |
| 3,452,073 | 6/1969 | Shultz | 260/453 |
| 3,455,836 | 7/1969 | Shultz et al. | 252/182 |
| 3,462,470 | 8/1969 | Emery et al. | 260/453 |
| 3,471,417 | 10/1969 | Dickert | 260/2.5 |
| 3,471,418 | 10/1969 | Dickert et al. | 260/2.5 |
| 3,479,384 | 11/1969 | Heiss | 260/453 |
| 3,440,086 | 4/1969 | Kerns | 117/105.5 |
| 3,499,021 | 3/1970 | Kober et al. | 260/453 |

OTHER PUBLICATIONS

Saunders et al., Polyurethanes Part II. Interscience New York (1964) pages 71–72.

Primary Examiner—Donald E. Czaja
Assistant Examiner—H. S. Cockeram
Attorney—Fred C. Carlson

[57] ABSTRACT

In processes for producing flexible polyurethane foams having sag factors higher than 2.5, which processes include the step of reaction of a polyisocyanate with a polymeric polyol, the improvement of using as the polyisocyanate an undistilled primary diamine phosgenation product having an amine equivalent of from 87 to 168, and conducting the reaction in the presence of a catalyst, a blowing agent, and a chain extender consisting of a primary amine.

9 Claims, No Drawings

POLYURETHANE FOAMS

BACKGROUND OF THE INVENTION

Polyurethane foams have previously been formed by reaction of a polyisocyanate (which may be obtained by phosgenating a primary diamine) with a di- or higher-functional hydroxy compound, such as a polymeric polyol. If desired the polyurethane may be formed in the presence of a chain extender and a blowing agent, such as, for example, water.

Flexible polyurethane foam produced either as slabstock or in a specifically moulded configuration has gained wide acceptance as a low-cost seating material in the furniture and allied industries. Polyurethane foam of this type has a load deflection curve characterized by a rapid buildup in hardness followed by a plateau or knee effect resulting in a relatively low sag factor (sag factor is defined as the ratio of the load factor at 65 percent deflection to the load factor at 25 percent deflection). The sag factor of such polyurethane foams can be increased by raising the specific gravity of the foam and this may be done either by reducing the level of blowing agent or by using an inert filler such as barytes. However these techniques will not normally produce a flexible foam having a sag factor in excess of 2.5. A high sag factor, i.e., a sag factor in excess of 2.5, is important where one wishes to simulate the properties of latex (i.e., natural rubber) foam, which has a high sag factor. Latex foam does, however, have low strength characteristics.

SUMMARY

It has now been found that flexible polyurethane foams having such high sag factors may be prepared by formulating with carefully selected ingredients, as hereinafter described, the reactants including as a polyisocyanate component, an undistilled primary diamine phosgenation product, and as a chain extender, a primary diamine.

According to the present invention therefore I provide a process for the preparation of a flexible polyurethane foam which includes the step of reacting an undistilled primary diamine phosgenation product having an amine equivalent of from 87 to 168 with a polymeric polyol in the presence of a primary diamine as a chain extender, a blowing agent and a catalyst.

If desired, the process according to the invention may be carried out with the couse of a nonpolymeric polyol, to impart qualities such as improved flexibility to the foam, and other agents used in the production of polyurethane foams.

DESCRIPTION OF THE PREFERRED EMBODIMENTS

The process according to the invention will now be described in more detail with respect to (A) the undistilled primary diamine phosgenation product; (B) the polymeric polyol; (C) the primary diamine; (D) the blowing agent; (E) the catalyst; (F) the nonpolymeric polyol and (G) other agents used in the production of polyurethane foams.

A. Undistilled Primary Diamine Phosgenation Product

This will be described primarily with reference to toluene diamine phosgenation products but is not limited thereto. The undistilled primary diamine phosgenation product is preferably prepared from a mixture containing toluene-2,4- and -2,6-diamines free from reaction solvent. Undistilled products of this type contain, in addition to tolylene -2,4- and -2,6-diisocyanates, other polyisocyanates and the presence of these other polyisocyanates is essential to the success of the invention. It is however not necessary to use the undistilled product alone as the polyisocyanate component of the polyurethane reaction mixture. One may, for example, add a proportion of relatively pure tolylene diisocyanate such as distilled tolylene diisocyanates or a mixture of tolylene-2,4- and -2,6-diisocyanates to the undistilled product. The weight ratio of tolylene-2,4- and -2,6-diisocyanates may be from 4:1 to 5:1.

The undistilled phosgenation product (A) may be crude tolylene diisocyanate having an NCO content of about 41–45% and normally obtained as a crude fraction, stripped of solvent, in the manufacture of tolylene diisocyanate. Alternatively the undistilled phosgenation product (A) may be prepared by combining the above-described crude tolylene diisocyanate having an NCO content of 41–45% with a tar component obtained as a byproduct in the phosgenation process and having an NCO content of 20–30% e.g., about 25%. The tar component preferably contains about 60 percent byproduct polymers as residue together with about 40 percent tolylene diisocyanate.

The crude tolylene diisocyanate and the tar component may be combined in varying quantities to produce a phosgenation product of any desired amine equivalent. A complete range of amine equivalent may be obtained by combining the above tar component with pure tolylene diisocyanate.

Component (A) may be used in the form of a polymer of a crude tolylene diisocyanate with a polyol provided said polymer has an amine equivalent falling within the aforesaid range.

Component (A) preferably has an amine equivalent of from 90 to 110.

Although this aspect of the invention has been described primarily with reference to tolylene diisocyanate-containing products it will be appreciated that other diisocyanate-containing products having similar characteristics may be employed, e.g., those containing methylene bis(phenylisocyanate), polyarylene polyisocyanates, cycloaliphatic diisocyanates or metaphenylene diisocyanate.

Polyurethane foams prepared according to the invention show significant flame retardancy (as measured by ASTM D 1692-59T) when the undistilled primary diamine phosgenation product is crude tolylene diisocyanate having an NCO content of about 41–45%. Foams prepared in this manner in the absence of a silicone stabilizer of the polyoxyalkyleneether-polydimethylsiloxane block copolymer type and having a density in excess of 1.5 lb./ft.$^3$ tend to be self-extinguishing and, when the density is above 2.3 lb./ft.$^3$, the foams tend to be nonburning. Although it is preferable to use crude tolylene diisocyanate having an NCO content of about 41–45% and normally obtained as a crude fraction, stripped of solvent, in the manufacture of tolylene diisocyanate when one wishes to obtain foams possessing fire-retardant properties, minor amounts of a tar component or a distilled tolylene diisocyanate component may be added provided, in general the NCO content of component (A) is not allowed to fall below about 41% or to exceed about 45%.

To further improve the flame retardancy of the foams chlorinated primary diamines may be included in the formulations as well as conventional additives used to impart flame retardancy such as phosphonated or halogenated plasticizers and flame-retardant fillers e.g., antimony trioxide.

B. Polymeric Polyol

The polymeric polyol preferably has a number average molecular weight of 3,000 or more and desirably below 7,000 and possibly 8,000. I have found a number average molecular weight range of 4,500 to 6,000 to be a particularly convenient range to employ. The polymeric polyol is conveniently a polyalkylene ether polyol e.g., triol or diol or mixture thereof. Polyether polyols of this type can be obtained by reaction of an alkylene oxide, e.g., ethylene oxide, propylene oxide, trimethylene oxide or butylene oxide or a mixture of two or more thereof, with a polyhydric alcohol such as ethylene glycol, propylene glycol, dipropylene glycol, tetramethylene glycol, glycerol, trimethylolpropane or a mixture of two or more thereof. Polymeric polyols of this type derived from propylene oxide or a mixture of propylene oxide with ethylene oxide either contain only secondary hydroxyl groups or a mixture of secondary and primary hydroxyl groups. By reacting these polyols with ethylene oxide one can obtain modified polyols having a high content of primary hydroxyl groups. These modified polyols are described as "capped" or "tipped"

polyether polyols and may with advantage be used in the process according to the invention.

Alternatively the polymeric polyol may be obtained by polymerizing a cyclic ether such as tetrahydrofuran.

The polyol may have a hydroxyl number of from 25 to 100.

C. Primary Diamine

The function of the primary diamine is to replace a portion of the active hydrogen usually supplied by water and/or the polyol. Various polyamines as described in U.S. Pat. No. 2,850,464 may be employed in the process of the invention.

It is preferred however to use an arylene diamine as the primary diamine component. The term "arylene diamine" is used herein to indicate a compound in which each of two amino groups is attached to the same or to different benzene radicals or related polycyclic aromatic hydrocarbon radicals. The diamine preferably has a $pK_b$ of at least 8.7 since diamines having $pK_b$ values below about 8.7, that is more basic than p-toluidine, normally react so rapidly with isocyanate components that satisfactory mixing is difficult and heterogeneous products may be formed. However diamines with a $pK_b$ below about 8.7 may be used in minor amounts in association with diamines having $pK_b$ values above about 8.7 e.g., to vary the cure time of the polymer and the hardness of the material obtained. Mononuclear diamines which may be used include toluene diamines, e.g., o-toluene diamines, m-phenylene diamines and other derivatives of the phenylene diamines for example, 2,5-dichlorophenylene-1,4-diamine. In general, compounds having two phenyl radicals, each substituted with an amino group, meet the basicity requirement and are more readily accessible than the phenylene diamines. Compounds having two phenyl radicals may be represented by the general formula:

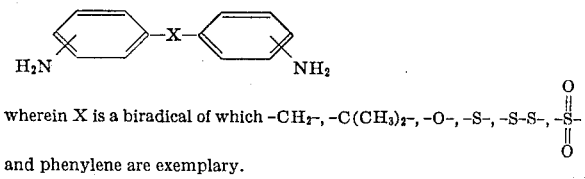

wherein X is a biradical of which $-CH_2-$, $-C(CH_3)_2-$, $-O-$, $-S-$, $-S-S-$, $-\overset{O}{\underset{O}{\overset{\|}{S}}}-$ and phenylene are exemplary.

X may also represent a direct bond and in this case the phenyl radicals are joined together directly to provide a biphenyl radical. The amino groups shown in the general formula may be ortho, meta or para to the position of X and may be positioned differently on the two rings. However, compounds in which the amino groups occupy para positions are preferred because of their availability. Other substituents which are inert to isocyanate groups may also be present on the benzene nuclei. Suitable diamines of this class include 4,4'-methylenebis (2-methylaniline), 4,4'-diaminodiphenyl-disulphide, 4,4'-methylenedianiline, 4,4'-methylenebis (2-chloraniline), 4,4'-diaminodiphenyl ether, 3,3'-dichlorobenzidine, 4,4'-diamino-3-chloro-3'-bromodiphenyl-methane, 4,4'-methylenebis (2-fluoroaniline), 4,4'-isopropylidenedianiline, 4,4'-methylenebis (2(2-methoxyaniline), 2,6-dichloro-1,5-diaminonaphthalene, and 2,3-dichloro-1,4-diaminonaphthalene.

It has been found that good results are obtained using 3-chloro-4,4'-diaminodiphenylmethane or a product containing this primary diamine as the arylene diamine. The use of this primary diamine and products containing it in the production of polyurethanes is described in French Pat. No. 1,524,589. Although 3-chloro-4,4'-diaminodiphenylmethane may be used in a relatively pure state it is preferred to use a crude reaction product prepared by condensing aniline and 2-chloroaniline with formaldehyde in the presence of a mineral acid, the mole ratio of aniline to 2-chloroaniline being 0.1:1 to 4.0:1 (preferably 0.1:1 to 1.0:1), the mole ratio of total amine to formaldehyde being 1.3:1 to 2.0:1 (preferably 1.65:1 to 1.9:1) and the mole ratio of mineral acid to total amine being 0.5:1 to 2.0:1 (preferably 0.9:1 to 1.2:1), unreacted amines preferably being removed from the reaction product by distillation. The aniline may be replaced wholly or partially by o-toluidine. o-Chloroaniline may be used alone at a mole ratio to formaldehyde of 1.3:1 to 1.8:1. A reaction product of this nature is believed to be a mixture containing one or more diamines, related triamines and higher polyamines in varying proportions. The diamines which may be present are 4,4'-methylenedianiline, 4,4'-methylenebis-(2-chloraniline) and 3-chloro-4,4'-diaminodiphenylmethane. The triamines are believed to have the following structure in which R, R' and R" are H or Cl:

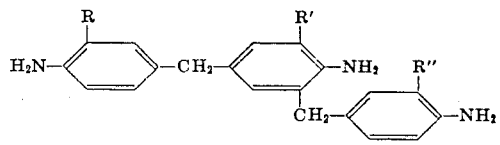

The higher polyamines are believed to have structures similar to that proposed for the triamines.

The amines may be employed in the process according to the invention in amounts of from 1–30 percent by weight calculated on the weight of polyol. Preferably when using compounds or mixtures of compounds containing a proportion of hindered amino groups and which are primarily composed of two linked phenyl radicals each containing an amino group, these compounds are used in amounts of 5–15 percent by weight calculated on the weight of the polymeric polyol.

D. Blowing Agent

The density of the foam may be varied by using different proportions of a blowing agent. Partly by reason of commercial considerations, water is the most convenient blowing agent to employ. Water offers an additional advantage as a blowing agent in that it not only undergoes an in situ reaction with the isocyanate component to produce carbon dioxide but also results in urea linkages which serve as cross-linking sites. Other blowing agents which may be employed include methylene chloride and fluorocarbons. Water may be used in conjunction with nonaqueous blowing agents such as methylene chloride and fluorocarbons to produce foams of lower density.

E. Catalyst

Catalyst systems employed may be of the usual type such as, for example, tertiary amine catalysts e.g., 1,4-diazobicyclo-2,2,2-octane, which catalyze the water-isocyanate reaction as well as the polyol-isocyanate reaction, N,N-dimethylethanolamine which preferentially catalyzes the water-isocyanate reaction rather than the polyol-isocyanate reaction and the usual organo-tin catalysts such, as, for example dibutyl tin dilaurate and stannous salts e.g., stannous octoate. It is significant that foams prepared in accordance with the present invention using N,N-dimethylethanolamine as catalyst may show an improvement in quality due to the use of this substance.

F. Nonpolymeric Polyol

If desired relatively low molecular weight polyols may be included in amounts of say less than 10 percent by weight, calculated on the weight of the polymeric polyol, to contribute qualities such as improved flexibility to the foam material.

G. Other Materials

Other materials which may conveniently be employed in the production of polyurethane foams according to the invention include stabilizers, pigments, fillers, flame retardants and extenders.

Stabilizers, for example, sulphonated castor oil and silicones, e.g., polydimethylsiloxanes may be added to improve the miscibility of the components. However, care should be taken when using silicones of the polyoxyalkyleneether-polydimethylsiloxane block copolymer type to avoid the production of closed-cell foams or collapsed foams i.e., foams having inter alia low sag factors. When manufacturing moulded foams it may be advantageous to include a relatively minor amount of a polydimethylsiloxane surfactant or a silicone of the above-described block copolymer type to modify the surface cell structure of the product, If it is desired to formulate a polyurethane foam exhibiting flame-retardant characteristics then, as explained above, it is generally advisable to omit silicones of the block copolymer type or to only use such materials in relatively minor amounts. Optimum amounts of such materials to be used for the particular effect desired may readily be determined by a simple trial run.

The polyurethane foams according to the invention may be made by prepolymer, semiprepolymer and one-shot foam techniques. Such techniques are well known to those skilled in the art and can be varied depending on the type of product desired.

In order that the invention may be well understood the following examples are given by way of illustration only. The products obtained in the examples had their characteristics determined according to ASTM 1564 except flammability which was evaluated according to ASTM 1692.

Examples 1 to 4 are designed to illustrate the properties obtained by employing polymeric polyols of different molecular weights

EXAMPLE 1

Slabstock foam was produced using an Admiral four-component foam-dispensing machine by pumping feeds A, B, C and D, at the rates specified below, into a mixing head. Virtually instantaneous blending occurs in the mixing head by the action of a high-speed, high-shear mixer of the basket type working at 3,000 r.p.m. For ease of handling feed A was run into the mixing head at a temperature of 35° C.

|  | Parts by weight |
|---|---|
| Feed A (pumping rate 1,000 g./6 sec.) |  |
| Triol[1] | 100 |
| Diaryl diamine[2] | 12.8 |
| Feed B (pumping rate 19.9 g./6 sec.) |  |
| Water | 2.0 |
| N,N-Dimethylethanolamine | 0.5 |
| 1,4-Diazo-bicyclo-2,2,2-octane | 0.05 |
| Feed C (pumping rate 23.18 g./6 sec.) |  |
| Stannous octoate | 0.3 |
| Dioctyl phthalate | 2.7 |
| Feed D (pumping rate 345.8 g./6 sec.) |  |
| Tolylene diisocyanate isomers[3] | 28.0 |
| Crude tolylene diisocyanate[4] | 11.2 |
| Trichloromonofluoromethane | 5.0 |

[1] Commercial polymeric triol, believed to be a polyoxypropylenetriol tipped with ethylene oxide, having a M.W. of about 5,000.

[2] Crude reaction product resulting from the condensation of aniline and 2-chloroaniline with formaldehyde in the presence of a mineral acid, described in Example 6 of my French Pat. No. 1,524,589.

[3] 80/20 mixture of 2:4-tolylene diisocyanate/2:6-tolylene diisocyanate.

[4] Crude tolylene diisocyanate having an NCO content of 38-40%.

This was prepared from crude tolylene diisocyanate having an NCO content of 41-45% obtained as a crude fraction, undistilled but stripped of reaction solvent, in the phosgenation of primary toluene diamines to tolylene diisocyanates by adding a tar component obtained as a byproduct in a said phosgenation process and having an NCO content of 20-30%, e.g., about 25%, so that the resulting NCO content is about 38-40%.

The blend was run out of a reciprocating head onto an endless belt inclined at about 10° to the horizontal. At ambient temperature gas bubbles began to form on the belt after about 6 seconds whereupon the foam rose for about 60 seconds.

Density lb./cu. ft. 3.5

|  | Initially | After ageing 16 hr. at 140° C. | After 5 hr. in steam at 121° C. |
|---|---|---|---|
| Tensile strength, p.s.i. | 25.0 | 7.7 | 14.5 |
| Elongation at break, % | 120.0 | 120 | 120 |
| Tear strength, p.l.i. | 3.0 | 1.1 | 2.4 |
| Compression/deflection (sample size =2×2×1 in. |  |  |  |
| 25%, p.s.i. | 0.475 | 0.25 | 0.69 |
| 50%, p.s.i. | 1.125 | 0.5 | 1.125 |

| Ball drop resilience, % | 62.0 |
|---|---|
| ILD on 4 in.-lb./50 sq. in. |  |
| 25% | 39.0 |
| 50% | 77.0 |
| 65% | 132.0 |
| Sag Factor | 3.4 |
| Hysteresis Retention, % | 82.0 |
| Static Fatigue (70% compression for 17 hr.), sample size 15×15×2 in. |  |
| Height loss as % of original height | 2.9 |
| % loss in load at 25% | 20.0 |
| % loss in load at 50% | 20.0 |
| Compression Set (after postcure for 8 hr. at 150° C.) at 22 hr. at 70° C. and 90% deflection | 12.6 (% loss in height) |

In the following table the performance of the product obtained in the example is compared in a number of tests with three commercially available materials;
1. Latex natural rubber foam
2. Filled polyurethane foam
3. High-density polyurethane foam.

| Type of foam | Latex natural rubber | Filled poly urethane | High density poly urethane | Product of Example 1 |
|---|---|---|---|---|
| Density, lb./cu.ft. | 4.8 | 3.0 | 3.4 | 3.5 |
| Tensile Strength, p.s.i. | 4.2 | 8.5 | 16.6 | 25.0 |
| Elongation at break, % | 170.0 | 170.0 | 230.0 | 120.0 |
| Tear Strength, p.l.i. | 0.6 | 1.2 | 2.7 | 3.0 |
| Compression Set (22 hr. at 70L C. and 90% deflection) | — | 5.3 | 5.0 | 12.6 |
| ILD on 4 in.-lb./50 sq. in. |  |  |  |  |
| 25% | 18.2 | 23.7 | 50.6 | 39.0 |
| 65% | 70.7 | 56.8 | 100.6 | 132.0 |
| Sag factor | 3.86 | 1.98 | 2.04 | 3.4 |
| Hysteresis Retention, % | 89.0 | 72.0 | 74.0 | 82.0 |
| Static Fatigue sample size = 15×15×2 in. |  |  |  |  |
| % loss—original height | 1.3 | 1.0 | 1.8 | 2.8 |
| % loss—25% | 16.4 | 15.6 | 29.2 | 20.0 |
| Ball drop resilience, % | 41.0 | 49.0 | 45.0 | 62.0 |

EXAMPLE 2

In a manner similar to that described in example 1 feeds A, B, C and D were run into a mixing head and after rapid blending, onto an endless belt via a reciprocating head

|  | Parts by weight |
|---|---|
| Feed A |  |
| Triol[5] | 100 |
| Diaryl diamine[2] | 12.8 |
| Feed B |  |
| Water | 2.0 |
| Turkey red oil | 1.0 |
| N,N-dimethylethanolamine | 0.5 |
| 1,4-Diazo-bicyclo-2,2,2-octane | 0.05 |
| Feed C |  |

|  |  |  |
|---|---|---|
| Stannous octoate | | 0.2 |
| Dioctyl phthalate | | 1.8 |
| Feed D | | |
| Tolylene diisocyanate isomers[3] | | 24.8 |
| Crude tolylene diisocyanate[4] | | 10.5 |

[5] Commercial polymeric triol, believed to be a polyoxypropylenetriol tipped with ethylene oxide, having a M.W. of about 6,000.

Gas bubbles began to form on the belt after about 8 seconds and the foam rose to its full height in 90 seconds. The foam was tack free after 180 seconds and the product obtained had the following characteristics.

|  |  |
|---|---|
| ILD on 4 in.-lb./50 sq. in. | |
| 25% | 60.8 |
| 50% | 106.0 |
| 65% | 172.0 |
| Sag factor | 2.8 |
| Hysteresis Retention, % | 53 |

EXAMPLE 3

In a manner similar to that described in example 1 feeds A, B, C and D were run into a mixing head and after rapid blending, onto an endless belt via a reciprocating head.

|  |  |  |
|---|---|---|
| Feed A | | |
| | Triol[6] | 100 |
| | Diaryl diamine[2] | 12.8 |
| Feed B | | |
| | Water | 2.0 |
| | N,N-dimethylethanolamine | 0.6 |
| | 1,4-Diazo-bicyclo-2,2,2-octane | 0.05 |
| Feed C | | |
| | Stannous octoate | 0.2 |
| | Dioctyl phthalate | 1.8 |
| | Dimethyl silicone[7] | 0.05 |
| Feed D | | |
| | Tolylene diisocyanate isomers[3] | 27.0 |
| | Crude tolylene diisocyanate[4] | 11.0 |
| | Trichloromonofluoromethane | 5.0 |

[6] Polyoxypropylene trimethylolpropane tipped with ethylene oxide, having a M.W. of about 4,500.

[7] MS 200/5 supplied by Midland Silicones Limited.

The product obtained had the following characteristics.

|  |  |
|---|---|
| ILD on 4 in.-lb./50 sq. in. | |
| 25% | 48.5 |
| 50% | 90.0 |
| 65% | 159.0 |
| Sag factor | 3.2 |
| Hysteresis Retention, % | 50 |

EXAMPLE 4

In a manner similar to that described in example 1 feeds A, B, C and D were run into a mixing head and after rapid blending, onto an endless belt via a reciprocating head.

|  |  |  |
|---|---|---|
| Feed A | | |
| | Triol[8] | 100 |
| | Diaryl diamine[2] | 12.8 |
| Feed B | | |
| | Water | 2.0 |
| | N,N-dimethylethanolamine | 0.6 |
| | 1,4-Diazo-bicyclo-2,2,2-octane | 0.05 |
| Feed C | | |
| | Stannous octoate | 0.3 |
| | Dioctyl phthalate | 2.7 |
| Feed D | | |
| | Tolylene diisocyanate isomers[3] | 28 |
| | Crude tolylene diisocyanate[4] | 11.2 |
| | Trichloromonofluoromethane | 10.0 |

[8] Commercial polymeric triol, believed to be a polyoxypropylene triol tipped with ethylene oxide, having a M.W. of about 3,000.

Gas bubbles began to form on the belt after about 7 seconds and the foam rose to its full height in 65 seconds. The foam was tack free after 90 seconds. The product obtained had the following characteristics.

|  |  |
|---|---|
| Density lb./ft.³ | 3.0 |
| Physical Properties | |
| Tensile Strength, p.s.i. | 17.3 |
| Elongation at break, % | 160 |
| Tear Strength, p.l.i. | 1.9 |
| Compression Set | |
| ILD on 4 in.-lb./50 sq. in. | |
| 50% | 87.0 |
| 90% | 97.0 |
| 25% | 13.2 |
| 50% | 25.5 |
| 65% | 40.4 |
| 75% | 70.6 |
| Sag factor | 3.02 |
| Hysteresis Retention, % | 67 |
| Static Fatigue | |
| % Height loss | 6.0 |
| Hardness loss in load at 25% | 41.2 |
| % Hardness loss in load at 50% | 41.6 |

EXAMPLE 5

This example is designed to illustrate the use of a prepolymer of a polyol and isocyanate in the preparation of polyurethane foams according to this invention. The prepolymer was prepared by rapid blending of the following components.

|  |  |
|---|---|
| Triol[9] | 90 |
| Tolylene diisocyanate isomers[3] | 28 |
| Crude tolylene diisocyanate[4] | 11.2 |

[9] Commercial polymeric triol, believed to be a polyoxypropylenetriol tipped with ethylene oxide, having a M.W. of about 5,000.

Feeds A and B were run into a mixing head rapidly and blended by the action of a high-speed, high-shear mixer as in example 1. The blend was then run onto an endless belt at a temperature of about 23° C.

|  |  |  |
|---|---|---|
| Feed A | | |
| | Prepolymer (described above) | 129.2 |
| | Trichloromonofluoromethane | 10.0 |
| Feed B | | |
| | Diaryl diamine[2] | 12.8 |
| | Triol[9] | 10.0 |
| | N,N-dimethylenethanolamine | 0.5 |
| | 1,4-Diazo-bicyclo-2,2,2-octane | 0.05 |
| | Water | 2.0 |

The product obtained had a density of 3.8 lb./cu. ft. and exhibited cold cure and sag factor characteristics comparable to those of the foams described in earlier examples.

EXAMPLES 6–10

The following examples illustrate the different properties obtained by varying the amounts of tolylene diisocyanate isomers[3] and crude tolylene diisocyanate[4].

In a manner similar to that described in example 1 feeds A, B, C and D were run into a mixing head and, after rapid blending, onto an endless belt via a reciprocating head. For ease of handling feed A was, in all cases, run in at a temperature of 32° C.

| Example No. | 6 | 7 | 8 | 9 | 10 |
|---|---|---|---|---|---|
| Feed A | | | | | |
| Triol[9] | 100 | 100 | 100 | 100 | 100 |
| Diaryl diamine[2] | 12.8 | 12.8 | 12.8 | 12.8 | 12.8 |
| Feed B | | | | | |
| Water | 2.0 | 2.0 | 2.0 | 2.0 | 2.0 |
| Turkey red oil | 1.0 | 1.0 | 1.0 | 1.0 | 1.0 |
| N,N-dimethyl-ethanolamine | 0.5 | 0.5 | 0.5 | 0.5 | 0.5 |
| 1,4-Diazo-bicyclo-2,2,2-octane | 0.05 | 0.05 | 0.05 | 0.05 | 0.05 |
| Feed C | | | | | |

| | | | | | |
|---|---|---|---|---|---|
| Dioctylphthalate | 2.7 | 2.7 | 2.7 | 2.7 | 2.7 |
| Stannous octoate | 0.3 | 0.3 | 0.3 | 0.3 | 0.3 |
| Feed D | | | | | |
| Tolylene diisocyanate isomers[3] | 26.2 | 17.5 | 8.75 | — | — |
| Crude tolylene diisocyanate[4] | 10.8 | 21.8 | 32.6 | 43.5 | — |
| Crude tolylene diisocyanate[4a] | — | — | — | — | 40.0 |

[4a] Crude tolylene diisocyanate having an NCO content of 41–45% obtained as a crude fraction, undistilled but stripped of reaction solvent, in the phosgenation of primary toluene diamines to tolylene diisocyanate.

The following table indicates the times in seconds at which gas bubbles began to form on the endless belt (cream time) the times in seconds which the foam took to rise to its full height (rise time) and the times in seconds after which the foam had reached the tack-free condition (tack-free time).

| Example No. | 6 | 7 | 8 | 9 | 10 |
|---|---|---|---|---|---|
| Cream Time | 7 | 7 | 8 | 8 | 8 |
| Rise Time | 65 | 73 | 75 | 73 | 73 |
| Tack-free Time | 120 | 105 | 95 | 90 | 150 |

The products obtained had the following characteristics:

| Example No. | 6 | 7 | 8 | 9 | 10 |
|---|---|---|---|---|---|
| Density, lb./ft.³ | 3.2 | 3.4 | 3.5 | 3.5 | 4.01 |
| Physical Properties | | | | | |
| Tensile Strength, p.s.i. | 24.5 | 27.5 | 28.5 | 28.0 | 28.0 |
| Elongation at break, % | 290 | 270 | 270 | 240 | 130 |
| Tear, p.l.i. | 2.9 | 2.6 | 2.8 | 2.5 | 2.6 |
| Compression/Deflection | | | | | |
| Initial | | | | | |
| 25% p.s.i. | 0.3 | 0.25 | 0.625 | 0.44 | 0.94 |
| 50% p.s.i. | 0.56 | 0.75 | 1.0 | 1.44 | 1.56 |
| Dry Heat Ageing | | | | | |
| 16 Hours at 140° C. | | | | | |
| 25% p.s.i. | 0.7 | 0.7 | 0.63 | 0.7 | 0.7 |
| 50% p.s.i. | 1.9 | 1.12 | 0.97 | 1.2 | 1.2 |
| Humid Ageing | | | | | |
| 5 hours at 121° C. in steam | | | | | |
| 25% p.s.i. | 0.3 | 0.4 | 0.4 | 0.6 | 0.88 |
| 50% p.s.i. | 0.5 | 0.6 | 0.66 | 0.93 | 1.3 |
| Compression Set | | | | | |
| % of original | | | | | |
| 50% | 7.8 | 9.2 | 35.6 | 3.0 | 7.5 |
| 90% | 76.5 | 86.5 | 90.0 | 88.0 | 14.0 |
| Ball Drop Resilience, % | 56 | 57 | 53 | 55 | 60 |
| ILD on 4 in.-lb./50 sq. in. | | | | | |
| 25% | 24.4 | 35.0 | 39.8 | 55.0 | 79.0 |
| 65% | 67.0 | 96.8 | 106.5 | 149.2 | 213.0 |
| Sag Factor | 2.8 | 2.8 | 2.7 | 2.7 | 2.7 |
| Static Fatigue | | | | | |
| Loss in height as % of original | 1.0 | 2.2 | 1.9 | 2.1 | — |
| Loss in load at 25% as % | 24.2 | 25.0 | 24.4 | 40.6 | (Not tested) |
| Loss in load at 50% as % | 23.7 | 23.4 | 24.7 | 24.1 | |
| Flammability | | | | | Self-extinguishing |

EXAMPLE 11–13

The following examples illustrate the production of moulding formulations from varying amounts of tolylene diisocyanate isomers[3] and crude tolylene diisocyanate[4].

In a manner similar to that described in example 1 feeds A, B, C and D were run into a mixing head but, after rapid blending, the mixture was run into a static mould. The moulded object was removed from the mould after 30 minutes at 23° C.

Cream times, rise times and tack-free times have the meanings assigned to examples 6–10. Other processing data and the characteristics of the products obtained are summarized below.

| Example No. | 11 | 12 | 13 |
|---|---|---|---|
| Feed A | | | |
| Triol[9] | 100 | 100 | 100 |
| Diaryl diamine[2] | 12.8 | 12.8 | 12.8 |
| Feed B | | | |
| Water | 2.0 | 2.0 | 2.5 |
| N,N-dimethylethanolamine | 0.5 | 0.5 | 0.5 |
| 1,4-Diazo-bicyclo-2,2,2-octane | 0.05 | 0.05 | 0.05 |
| Feed C | | | |
| Dioctyl phthalate | 3.6 | 3.6 | 3.6 |
| Stannous octoate | 0.4 | 0.4 | 0.4 |
| Dimethylsilicone[7] | 0.05 | 0.05 | 0.05 |
| Feed D | | | |
| Trichloromonofluoromethane | 10.0 | 10.0 | 10.0 |
| Crude Tolylene diisocyanate[4] | 11.0 | — | 12.8 |
| Tolylene diisocyanate isomer[3] | 27.0 | — | 31.0 |
| Crude tolylene diisocyanate[4a] | — | 40.0 | — |
| Cream Time | 8 | 10 | 8 |
| Rise Time | 70 | 80 | 70 |
| Tack-free Time | 130 | 180 | 130 |
| Cure Time at room temperature, min. | 30 | 30 | 30 |
| Insulated mould, min. | 15 | 15 | 15 |
| at 100° C. min. | 5 | 5 | 5 |
| Physical Properties | | | |
| Density moulded, lb./ft.³ | 3.1 | 3.1 | 2.7 |
| Free Rise | 2.8 | 2.8 | 2.5 |
| ILD at 4 in.-lb./50 sq. in. | | | |
| 25% | 40.0 | 46.0 | 32.6 |
| 50% | 80.5 | 93.0 | 69.0 |
| 65% | 134.0 | 157.0 | 122.0 |
| Sag Factor | 3.4 | 3.4 | 3.75 |
| Hysteresis Retention % | 67.0 | 63.0 | 75.0 |
| Flammability | | | Self-extinguishing |

EXAMPLES 14–17

The following examples illustrate the different properties obtained by lowering the levels of diaryl diamine[2]. Analogous runs were carried out in the presence and absence of small amounts of o-toluene diamine.

In a manner similar to that described in example 1 feeds A, B, C and D were run into a mixing head and, after rapid blending, onto an endless belt via a reciprocating head.

| Example No. | 14 | 15 | 16 | 17 |
|---|---|---|---|---|
| Feed A | | | | |
| Triol[9] | 100 | 100 | 100 | 100 |
| Diaryl diamine[2] | 6.4 | 6.4 | 3.2 | 3.2 |
| o-Toluene diamine | — | 1.0 | — | 1.0 |
| Feed B | | | | |
| Water | 2.0 | 2.0 | 2.0 | 2.0 |
| N,N-Dimethylethanolamine | 0.5 | 0.5 | 0.5 | 0.5 |
| 1,4-Diazo-bicyclo-2,2,2-octane | 0.05 | 0.05 | 0.05 | 0.05 |
| Feed C | | | | |
| Stannous octoate | 0.3 | 0.3 | 0.3 | 0.3 |
| Dioctyl phthalate | 2.7 | 2.7 | 2.7 | 2.7 |
| Feed D | | | | |
| Tolylene diisocyanate isomers[3] | 26.0 | 26.0 | 24.0 | 24.0 |

|  |  |  |  |  |
|---|---|---|---|---|
| Crude tolylene diisocyanate[4] | 10.0 | 10.0 | 9.0 | 9.0 |
| Trichloromonofluoromethane | 5.0 | 5.0 | 5.0 | 5.0 |

The following table illustrates the characteristics of the products obtained:

| Example No. | 14 | 15 | 16 | 17 |
|---|---|---|---|---|
| Cream Time, sec. | 8 | 6 | 10 | 8 |
| Rise Time, sec. | 100 | 90 | 105 | 95 |
| Tack-free time, sec. | 180 | 150 | 240 | 180 |
| Density, lb./ft.$^3$ | 2.4 | 2.6 | 2.2 | 2.3 |
| ILD 4 in.-lb./50 sq. in. |  |  |  |  |
| 25% | 18.3 | 21.8 | 15.2 | 16.5 |
| 50% | 32.8 | 38.6 | 27.6 | 28.6 |
| 65% | 50.5 | 61.5 | 43.0 | 43.0 |
| 75% | 86.0 | 106.0 | 72.0 | 69.0 |
| Sag Factor | 2.75 | 2.8 | 2.8 | 2.9 |
| Hysteresis Retention % | 84.0 | 72.5 | 78.0 | 80.0 |

EXAMPLES 18-20

The following examples illustrate the different properties obtained by replacing the diaryl diamine[2] by varying amounts of 4,4'-methylenebis (2-chloraniline) and m-phenylene diamine.

In a manner similar to that described in example 1 feeds A, B, C and D were run into a mixing head and, after rapid blending, onto an endless belt via a reciprocating head.

| Example No. | 18 | 19 | 20 |
|---|---|---|---|
| Feed A |  |  |  |
| Triol[9] | 100.0 | 100.0 | 100.0 |
| 4,4'-Methylenebis (2-chloroaniline) | 12.8 | 9.6 | 6.4 |
| m-Phenylene diamine | – | 3.2 | 6.4 |
| Feed B |  |  |  |
| Water | 2.0 | 2.0 | 2.0 |
| N,N-Dimethylethanolamine | 0.5 | 0.5 | 0.5 |
| 1,4-Diazo-bicyclo-2,2,2-octane | 0.05 | 0.05 | 0.05 |
| Feed C |  |  |  |
| Stannous Octoate | 2.7 | 2.7 | 2.7 |
| Dioctyl phthalate | 0.3 | 0.3 | 0.3 |
| Feed D |  |  |  |
| Tolylene diisocyanate isomers[3] | 27.0 | 27.0 | 27.0 |
| Crude Tolylene Diisocyanate[4] | 11.0 | 11.0 | 11.0 |
| Trichloromonofluoromethane | 5.0 | 5.0 | 5.0 |

The following table indicates the cream times, rise times and tack-free times together with the characteristics of the products obtained.

| Example No. | 18 | 19 | 20 |
|---|---|---|---|
| Cream Time, secs. | 10 | 5 | (compound gelled in mixer) |
| Rise Time, secs. | 70 | 60 |  |
| Tack-free, secs. | 240 | 180 |  |
| Density, lb./ft.$^3$ | 2.3 | 2.3 |  |
| ILD, 4 in.-lb./50 sq. in. (Sample size 15×15×4 in.) |  |  |  |
| 25% | 15.4 | 15.8 |  |
| 50% | 29 | 28.6 |  |
| 65% | 46 | 45.7 |  |
| 75% | 80 | 81 |  |
| Sag Factor | 3.0 | 3.0 |  |
| Hysteresis Retention | 72% | 84% |  |

EXAMPLES 21-23

The following examples illustrate the different properties obtained by varying the composition of feed D (the isocyanate-containing feed).

In a manner similar to that described in example 1 feeds A, B, C and D were run into a mixing head and, after rapid blending, onto an endless belt via a reciprocating head.

| Example No. | 21 | 22 | 23 |
|---|---|---|---|
| Feed A |  |  |  |
| Triol[10] | 100 | 100 | 100 |
| Diaryl diamine[2] | 12.8 | 12.8 | 12.8 |
| Feed B |  |  |  |
| Water | 2.0 | 2.0 | 2.0 |
| N,N-Dimethylethanolamine | 1.0 | 1.0 | 1.0 |
| 1,4-Diazo-bicyclo-2,2,2-octane | 0.33 | 0.33 | 0.33 |
| Feed C |  |  |  |
| Stannous octoate | – | – | 0.1 |
| Dioctyl phthalate | – | – | 0.9 |
| Feed D |  |  |  |
| Tolylene diisocyanate isomers[3] | 26.6 | – | – |
| Tolylene diisocyanate/polyol prepolymer[11] | 10.9 | 10.9 | – |
| Tolylene diisocyanate isomers[12] | – | 26.6 | 17.7 |
| Crude tolylene diisocyanate[4] | – | – | 19.8 |
| Trichloromonofluoromethane | 5.0 | 5.0 | – |

[10]Commercial polymeric triol, believed to be a polyoxypropylene triol, tipped with ethylene oxide, having a M.W. of about 4,500.

[11]A polymer of crude tolylene diisocyanate and a commercial polyol having a free NCO content of about 39%.

[12]65/35 mixture of 2:4-tolylene diisocyanate/2:6-tolylene diisocyanate.

The following table indicates the characteristics of the products obtained.

| Example No. | 21 | 22 | 23 |
|---|---|---|---|
| Density lb./cu. ft. | 2.6 | 2.8 | 3.4 |
| Tensile strength p.s.i. | 19 | 26 | 31 |
| Elongation at break % | 145 | 170 | 225 |
| Tear strength, p.l.i. | 2.3 | 2.5 | 2.9 |
| ILD 4 in.-lb./50 sq. in. |  |  |  |
| 25% | 32 | 28 | 33 |
| 65% | 72 | 71 | 86 |
| Sag factor | 2.23 | 2.54 | 2.61 |
| Hysteresis retention, % | 73.8 | 71.1 | 71.8 |
| Ball drop resilience, % | 62 | 54 | 59 |
| Compression Set % |  |  |  |
| 50% deflection | 10 | 15 | 17 |
| 90% deflection | 83 | 88 | 89 |
| Static fatigue |  |  |  |
| % loss lb. hgt. | 1.5 | 2.5 | 2.1 |
| % loss 25% ILD | 21.5 | 23.9 | 21.2 |
| Flammability |  |  | Self-extinguishing |

EXAMPLES 24 and 25

These examples illustrate the flame-retardancy properties obtained when crude tolylene diisocyanate having an NCO content of 41-45%, obtained as a crude fraction, stripped of solvent, in the manufacture of tolylene diisocyanate is employed as the polyisocyanate component.

In a manner analogous to that described in example 1 feeds A, B and C were run into a mixing head and, after rapid blending, onto an endless belt (at an output of 10 kg./min.) via a reciprocating head. The belt was travelling at 30 ft./min. and was inclined at an angle of 5° to the horizontal.

| Example No. | 24 | 25 |
|---|---|---|
| Feed A | | |
| Triol[13] | 100.0 | 100.0 |
| Diaryl diamine[2] | 5.0 | 5.0 |
| Feed B | | |
| Water | 2.5 | 3.0 |
| 1,4-Diazobicyclo-2,2,2-octane | 0.2 | 0.2 |
| Feed C | | |
| Crude tolylene diisocyanate[m] | 38.6 | 44.0 |

[13]Commercial polymeric triol, believed to be a polyoxypropylene triol, tipped with ethylene oxide, having a M.W. of about 5,000.

The following table shows the characteristics of the products obtained. The products had cream times of 10 sec. and 7 sec. respectively.

| Example No. | 24 | 25 |
|---|---|---|
| Density lb./ft.³ | 2.5 | 2.1 |
| Physical Properties | | |
| Tensile strength, p.s.i. | 11.0 | 18.6 |
| Elongation at break, % | 130.0 | 100.0 |
| Tear strength, p.l.i. | 1.1 | 1.0 |
| ILD on 4 in.-lb./50 sq. in. (sample size 15×15×4 in.) | | |
| At 25% Deflection | 16.1 | 21.8 |
| 50% Deflection | 28.2 | 37.4 |
| 65% Deflection | 44.0 | 57.4 |
| 75% Deflection | 74.4 | 93.9 |
| Sag Factor | 2.74 | 2.63 |
| Hysteresis Retention, % | 81.5 | 79.0 |
| Compression Set | | |
| At 50% Deflection | 9.6 | 4.3 |
| 70% Deflection | – | 3.9 |
| Static Fatigue | | |
| % Height Loss | <2 | <2 |
| % Hardness Loss | | |
| At 25% Deflection | 19.4 | 24.0 |
| 50% Deflection | 21.7 | 23.0 |
| Flammability | Non burning | Self-extinguishing |

EXAMPLES 26 and 27

The examples illustrate the flame-retardancy properties obtained when a higher proportion of diaryl diamine[(2)] is used in the polyurethane formulation.

In a manner analogous to that described in example 1 feeds A, B and C were run into a mixing head and, after blending at a mixer speed of 4,500 r.p.m., onto an endless belt (at an output of 100 kg./min.) via a reciprocating head. The belt was travelling at 20 ft./min. and was inclined at an angle of 5° to the horizontal.

| Example No. | 26 | 27 |
|---|---|---|
| Feed A | | |
| Triol[13] | 100.0 | 100.0 |
| Diaryl diamine[2] | 15.0 | 15.0 |
| Feed B | | |
| Water | 2.0 | 2.0 |
| 1,4-Diazo-bicyclo-2,2,2-octane | 0.05 | 0.05 |
| Feed C | | |
| Crude tolylene diisocyanate[m] | 41.8 | 46.0 |

The following table shows the characteristics of the products obtained. Both products had cream times of 6.0 sec.

| Example No. | 26 | 27 |
|---|---|---|
| Density lb./ft.³ | 4.5 | 4.4 |
| Physical Properties | | |
| Tensile strength, p.s.i. | 27.0 | 26.5 |
| Elongation at break, % | 110.0 | 110.0 |
| Tear strength, p.l.i. | 2.8 | 2.3 |
| ILD on 4 in.-lb./50 sq. in. | | |
| 25% Deflection | 95.9 | 107.1 |
| 50% Deflection | 166.5 | 187.2 |
| 65% Deflection | 264.0 | Too hard |
| Sag Factor | 2.65 | – |
| Hysteresis Retention, % | 74.0 | 78.0 |
| Compression Set (% of original) | | |
| 50% | 7.5 | 8.0 |
| 70% | 10.5 | 9.5 |
| Flammability | Self-extinguishing | Self-extinguishing |

We claim:

1. In a process for producing a flexible polyurethane foam by effecting reaction between (a) a polyisocyanate and (b) a polymeric polyol which is a polyalkylene ether having a number average molecular weight in the range of 3,000 to 7,000, in the presence of (c) a catalyst and (d) a blowing agent, the improvements of (1) increasing the sag factor of a said foam to above about 2.5 by using as the polyisocyanate an undistilled primary diamine phosgenation product having an amine equivalent of from 87 to 168, and (2) conducting the reaction in the presence of from 1 to 30 percent by weight, calculated on the weight of the polyol, of a primary arylene diamine as a chain extender.

2. A process of claim 1 wherein said phosgenation product has an amine equivalent of from 90 to 110 and is prepared by phosgenating toluene-2,4-diamine, toluene-2,6-diamine, or a mixture of them, said phosgenation product being free from reaction solvent.

3. A process of claim 2 wherein said phosgenation product is crude tolylene diisocyanate having an NCO content of 41 to 45 percent.

4. A process of claim 1 wherein the polymeric polyol has a number average molecular weight of 4,500 to 6,000, and is a diol, triol, or mixture thereof.

5. A process of claim 4 wherein the polymeric polyol is obtained by reaction of a polyhydric alcohol with (a) propylene oxide or (b) a mixture of propylene oxide and ethylene oxide or (c) propylene oxide followed by ethylene oxide.

6. A process of claim 1 wherein said primary diamine is selected from the group consisting of toluene diamines, phenylene diamines, and compounds having two phenyl radicals, each substituted with an amino group.

7. A process of claim 6 wherein said primary diamine is prepared by condensing aniline and 2-chloroaniline with formaldehyde in the presence of a mineral acid.

8. A process of claim 1 wherein said primary diamine is primarily composed of two linked phenyl radicals each containing an amino group, said primary diamine having a $pK_b$ of at least 8.7 and being used in amounts of from 5 to 15 percent by weight calculated on the weight of the polymeric polyol.

9. A polyurethane foam having a density in excess of 1.5 lb./ft.$^3$, and a sag factor of above about 2.5 prepared by a process of claim 1 and in the absence of a silicone stabilizer of the polyoxyalkylene ether-polydimethylsiloxane block copolymer type.

* * * * *